(12) United States Patent
Rank et al.

(10) Patent No.: US 10,152,126 B2
(45) Date of Patent: Dec. 11, 2018

(54) MULTIPLEXING AND DEMULTIPLEXING HAPTIC SIGNALS

(71) Applicant: Immersion Corporation, San Jose, CA (US)

(72) Inventors: Stephen D. Rank, San Jose, CA (US); Satvir Singh Bhatia, San Jose, CA (US); Arnab Sen, San Jose, CA (US); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 44 days.

(21) Appl. No.: 15/131,510

(22) Filed: Apr. 18, 2016

(65) Prior Publication Data
US 2016/0231816 A1    Aug. 11, 2016

Related U.S. Application Data

(63) Continuation of application No. 14/185,102, filed on Feb. 20, 2014, now Pat. No. 9,317,120.
(Continued)

(51) Int. Cl.
*G06F 3/01* (2006.01)
*G08B 6/00* (2006.01)
(Continued)

(52) U.S. Cl.
CPC .............. *G06F 3/016* (2013.01); *G06F 3/041* (2013.01); *G08B 6/00* (2013.01); *H04N 21/235* (2013.01);
(Continued)

(58) Field of Classification Search
CPC .... G06F 2203/014; G06F 3/016; G06F 3/041; G08B 6/00; H04N 21/23439;
(Continued)

(56) References Cited

U.S. PATENT DOCUMENTS 3,665,304 A    5/1972    Maybach
5,142,537 A    8/1992    Kutner et al.
(Continued)

FOREIGN PATENT DOCUMENTS

CN    1350764 A    5/2002
CN    101828382 A    9/2010
(Continued)

OTHER PUBLICATIONS

Office Action dated Feb. 2, 2018 in corresponding Chinese Patent Application No. 201410452654.8.
(Continued)

*Primary Examiner* — Mohamed Barakat
(74) *Attorney, Agent, or Firm* — Medler Ferro Woodhouse & Mills PLLC

(57) ABSTRACT

A system receives a multiplexed signal with two or more different types of haptic signals encoded therein. Each type of haptic signal represents a haptic effect for different types of haptic output devices. The system determines a target haptic output device located on a haptic playback device. The system demultiplexes the multiplexed signal into at least the type of haptic signal corresponding to the target output device. The system provides the demultiplexed haptic signal to the target haptic output device.

12 Claims, 9 Drawing Sheets

Related U.S. Application Data

(60) Provisional application No. 61/907,138, filed on Nov. 21, 2013, provisional application No. 61/874,920, filed on Sep. 6, 2013.

(51) Int. Cl.
  *H04N 21/235* (2011.01)
  *H04N 21/236* (2011.01)
  *H04N 21/41* (2011.01)
  *H04N 21/435* (2011.01)
  *G06F 3/041* (2006.01)
  *H04N 21/2343* (2011.01)

(52) U.S. Cl.
  CPC ... *H04N 21/23614* (2013.01); *H04N 21/4126* (2013.01); *H04N 21/4131* (2013.01); *H04N 21/435* (2013.01); *G06F 2203/014* (2013.01); *H04N 21/23439* (2013.01)

(58) Field of Classification Search
  CPC ........... H04N 21/235; H04N 21/23614; H04N 21/4126; H04N 21/4131; H04N 21/435
  See application file for complete search history.

(56) References Cited

U.S. PATENT DOCUMENTS

| | | |
|---|---|---|
| 5,805,601 A | 9/1998 | Takeda et al. |
| 6,342,880 B2 | 1/2002 | Rosenberg et al. |
| 6,480,528 B1 | 11/2002 | Patel et al. |
| 6,483,857 B1 | 11/2002 | Sloan et al. |
| 7,911,328 B2 | 3/2011 | Luden et al. |
| 8,294,557 B1 | 10/2012 | El Saddik et al. |
| 9,423,894 B2 * | 8/2016 | Olsson .................. G05G 9/047 |
| 10,007,340 B2 | 6/2018 | Cruz-Hernandez et al. |
| 2004/0047470 A1 * | 3/2004 | Candelore .............. H04N 5/783 380/240 |
| 2009/0096632 A1 * | 4/2009 | Ullrich ................. H04N 9/8205 340/4.21 |
| 2010/0199301 A1 * | 8/2010 | Hayashi ................ H04H 20/28 725/32 |
| 2011/0051012 A1 * | 3/2011 | Miyazaki ............. H04N 21/235 348/731 |
| 2012/0306631 A1 | 12/2012 | Hughes |
| 2013/0057509 A1 | 3/2013 | Cruz-Hernandez et al. |
| 2013/0106774 A1 | 5/2013 | Radivojevic et al. |
| 2013/0216228 A1 | 8/2013 | Nazarathy et al. |

FOREIGN PATENT DOCUMENTS

| | | |
|---|---|---|
| CN | 101907922 A | 12/2010 |
| EP | 2629179 A1 | 8/2013 |
| JP | 2011-501575 A | 1/2011 |
| JP | 2012-520520 A | 9/2012 |

OTHER PUBLICATIONS

Office Action dated Aug. 28, 2018 in corresponding Japanese Patent Application No. 2014-172417.

* cited by examiner

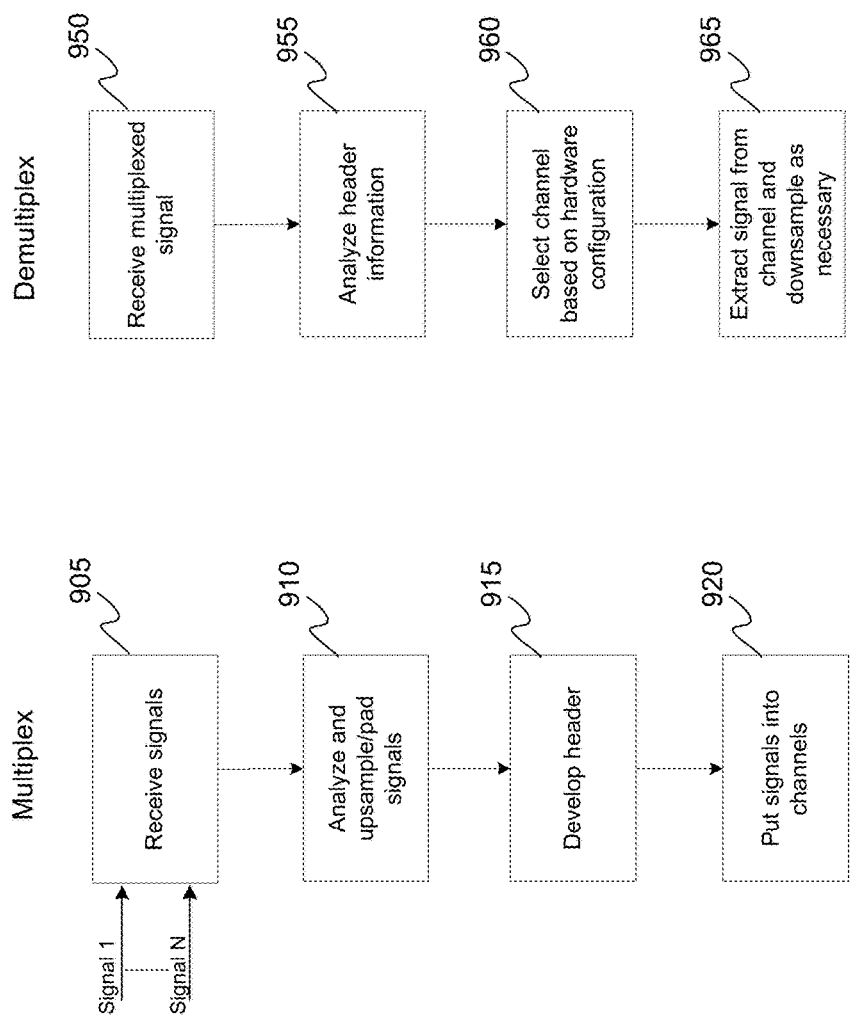

MULTIPLEXING AND DEMULTIPLEXING HAPTIC SIGNALS

CROSS REFERENCE TO RELATED APPLICATIONS

This application claims priority of U.S. patent application Ser. No. 14/185,102, filed on Feb. 20, 2014 and issued as U.S. Pat. No. 9,317,120, which claims priority of Provisional Patent Application Ser. No. 61/907,138, filed on Nov. 21, 2013, and Provisional Patent Application Ser. No. 61/874,920, filed on Sep. 6, 2013. The contents of each of these applications are hereby incorporated by reference.

FIELD

One embodiment is directed to a haptically-enabled device. More particularly, one embodiment is directed to a system that multiplexes or demultiplexes haptic signals to generate haptic effects.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify the user interface. For example, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable and mobile electronic devices, such as cellular telephones, smartphones, portable gaming devices, vehicle based devices and interfaces, and a variety of other portable and mobile electronic devices. For example, some portable gaming applications are capable of vibrating in a manner similar to control devices (e.g., joysticks, etc.) used with larger-scale gaming systems that are configured to provide haptic feedback.

In order to generate vibration or other effects, many devices utilize some type of actuator or haptic output device. Known actuators used for this purpose include an electromagnetic actuator such as an solenoid actuator, an Eccentric Rotating Mass ("ERM") actuator in which an eccentric mass is moved by a motor, a Linear Resonant Actuator vibration motor ("LRA"), or a piezoelectric actuator. Each of these target haptic actuators receives a haptic control signal that provides the parameters for the haptic effect. However, for a particular haptic effect, the haptic control signal may need to be varied based on the actuator that provides the haptic effect. Thus, for one haptic actuator, the control signal may be one type of signal representing, for example, an on or off condition, while for another haptic actuator, the control signal may be another type of signal representing, for example, a position value.

SUMMARY

One embodiment receives a multiplexed signal with two or more different types of haptic signals encoded therein. Each type of haptic signal represents a haptic effect for different types of haptic output devices. The system determines a target haptic output device located on a haptic playback device. The system demultiplexes the multiplexed signal into at least the type of haptic signal corresponding to the target output device. The system provides the demultiplexed haptic signal to the target haptic output device.

BRIEF DESCRIPTION OF THE DRAWINGS

FIG. 9 is a flow diagram illustrating multiplexing and demultiplexing haptic control signals in accordance with one embodiment.

DETAILED DESCRIPTION

One embodiment is a system that generates at least two haptic signals from the same input or source. The two haptic signals represent a haptic effect to be played on two different target haptic output devices. The system multiplexes/encodes the signals into a single multiplexed haptic signal stream sent to a haptic playback device. At the haptic playback device, the signals are de-multiplexed/decoded and the appropriate haptic signal is played on the device based on the haptic output device type.

Figure 1:
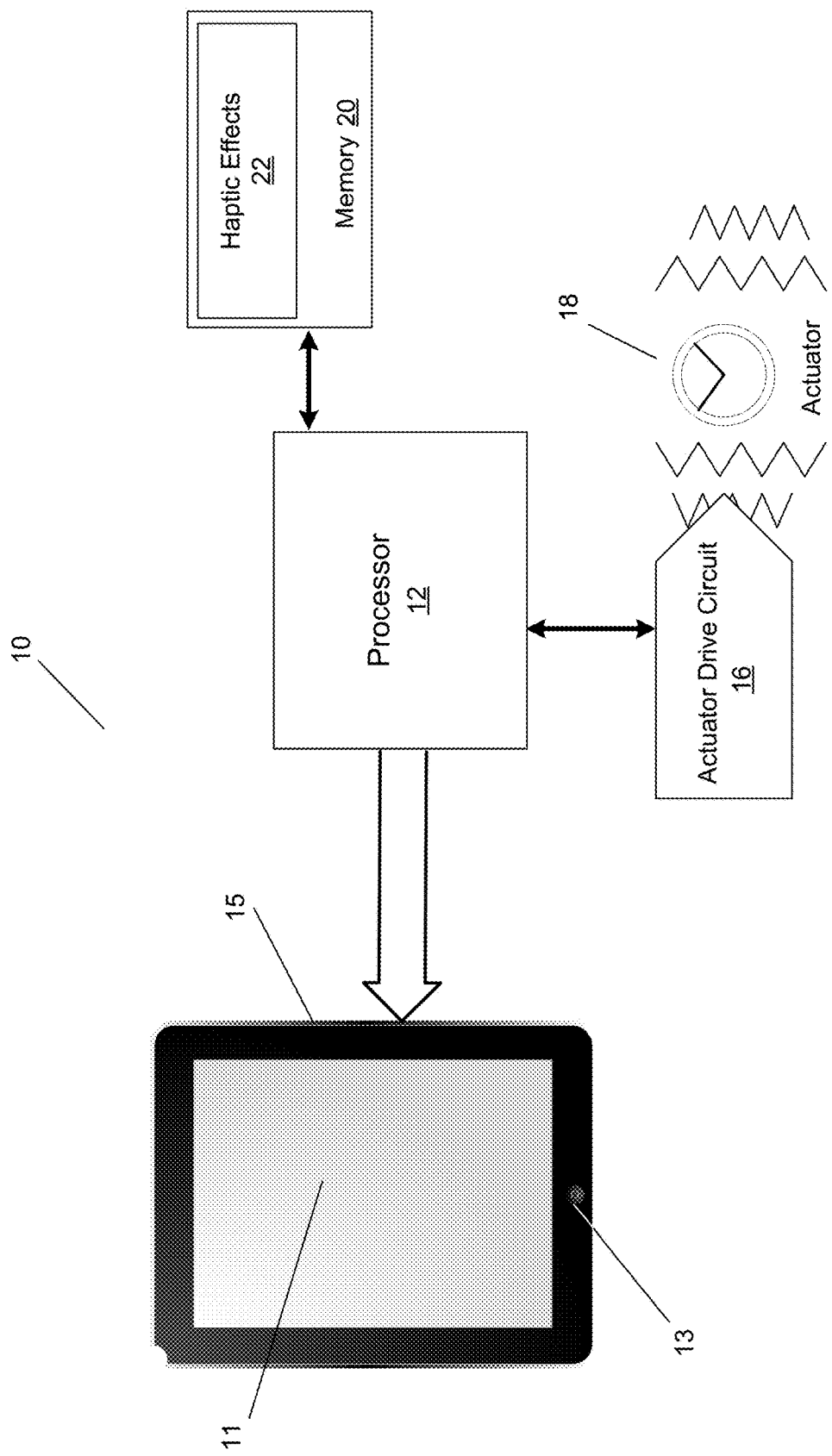
FIG. 1 is a diagram of a haptically-enabled system in accordance with one embodiment of the present invention.

FIG. 1 is a block diagram of a haptically-enabled system 10 in accordance with one embodiment of the present invention. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11.

The haptic feedback system includes a processor or controller 12. Coupled to processor 12 is a memory 20 and an actuator drive circuit 16, which is coupled to an actuator 18. Actuator 18 can be any type of Direct Current ("DC") motor, including without limitation an Eccentric Rotating Mass ("ERM"), a Linear Resonant Actuator vibration motor ("LRA"), a piezoelectric motor, or a solenoid actuator. In addition to or in place of actuator 18, system 10 may include other types of haptic output devices (not shown) that may be non-mechanical or non-vibratory devices such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, devices that provide electrical muscle stimulation, etc.

Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency, and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to actuator drive circuit 16, which includes electronic components and circuitry used to supply actuator 18 with the required electrical current and voltage (i.e., "motor signals") to cause the desired haptic effects. In instances where the haptic effects correspond to the playback of a multimedia file, such as a video file, processor 12 may provide the haptic control signal to the haptic drive circuit. System 10 may include more than one actuator 18, and each actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes a haptic effects module 22 which are instructions that, when executed by processor 12, generate drive signals for actuator 18 that provide haptic effects, as disclosed in more detail below. Memory 20 may also be located internal to processor 12, or any combination of internal and external memory.

Touch surface 11 recognizes touches, and may also recognize the position and magnitude of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such a cellular telephone, personal digital assistant ("PDA"), smartphone, computer tablet, gaming console, vehicle based interface, etc., or may be any other type of device that includes a haptic effect system that includes one or more actuators. The user interface may be a touch sensitive surface, or can be any other type of user interface such as a mouse, touchpad, mini-joystick, scroll wheel, trackball, game pads or game controllers, etc. In embodiments with more than one actuator, each actuator may have a different rotational capability in order to create a wide range of haptic effects on the device.

In addition to providing user interfacing haptic effects, system 10 may provide statically generated haptic effects for playback in system 10 along with, for example, a video or audio file.

Different devices support different levels of haptic playback capability. The type of haptic signals supported by a haptic playback device depends on a combination of the actuator used and the drive circuit of the actuator. Some devices may only support "basic haptics" which control a haptic actuator such as actuator 18 with a haptic signal which turns the actuator on or off according to an on/off binary signal. One sample rate for a basic haptic signal can be 200 Hz, but other sample rates may be used. In one example of a basic haptic signal, an ERM actuator may be configured to respond to a basic haptic signal. If the control signal tells the ERM to be on, the haptic drive circuit (e.g., drive circuit 16) for an ERM actuator will turn the ERM actuator on in accordance with the basic haptic signal.

Some devices may support "standard definition" haptics which control a haptic actuator such as actuator 18 with a haptic signal that varies the intensity of the haptic effect according to a signal encoded with one of 128 non-negative values for each sample of the standard definition haptic signal. One sample rate for a standard haptic signal can be 200 Hz, but other sample rates may be used. In one example of a standard definition haptic signal, an LRA actuator may be configured to respond to a standard definition haptic signal. A haptic drive circuit for an LRA actuator will control the LRA actuator according to the amplitude information at each 5 ms sample.

Some devices may support "high definition" haptics which control a haptic actuator such as actuator 18 with a haptic signal that varies the intensity of the haptic effect according to a signal encoded with a value of +/−127 for each sample of the high definition haptic signal. One sample rate for a high definition haptic signal can be 8 kHz, but other sample rates may be used. High definition haptic signals typically have higher sample rates than basic haptic or standard definition haptic signals. In one example of a high definition haptic signal, a piezoelectric actuator may be configured to respond to a high definition haptic signal. The haptic drive circuit for a piezoelectric actuator may control the piezoelectric actuator in accordance with the amplitude information every 125 μs.

Furthermore, the ramp-up/down times vary significantly between LRA actuators and ERM actuators and even between different models of ERM actuators. This means that even though the same type of signal may be used for multiple ERMs, a haptic effect programmer may want to specify different effects based on each actuator's capabilities. A haptic effect programmer may want to provide a customized haptic signal for a multitude of target devices with each signal being produced from the same source.

A problem arises when trying to deliver a single piece of media content that plays reasonably well across the widest range of devices. Therefore, one issue that haptic effect programmers face is that they may need to account for providing multiple haptic control signals based on the type of actuator or other haptic output device in the playback device. In addition, programmers may not know which type of haptic output device will be in use on the playback device. To deal with this problem, programmers could provide a high definition or standard definition signal intended for a piezoelectric actuator or LRA actuator and allow the end device to "warp" that signal into lesser or greater definition signals as required. This is not ideal because, for example, in the case of a standard definition haptic signal intended for an LRA actuator but actually playing back on a piezoelectric actuator, granularity would be lost in converting a 200 Hz signal into an 8 kHz signal, basically turning a piezoelectric actuator into an expensive LRA actuator. In the case of a high definition signal intended for a piezoelectric actuator but actually playing back on an ERM actuator supporting only basic haptics, the conversion may render the ERM actuator ineffectual.

One option may be to provide a haptic control signal for each of the expected range of haptic output devices in the end device, but in doing so, the bandwidth requirements for the haptic signals would be increased and some delivery mechanism is needed to organize the signals. Another option may be to encode two or more haptic signals together in a lossy way to incorporate data from the two or more haptic signals into one signal using the normally allotted bandwidth for the highest bitrate signal. Both of these approaches are contemplated herein.

Encode/Decode Multiplexing

Some embodiments multiplex multiple haptic signals so that each retains its native representation without requiring an end device, such as device 10, to convert one format into another format, and without increasing the bandwidth required to provide the haptic control signals. These embodiments provide at least an endpoint solution for a basic haptic signal; because capabilities of an end device are not necessarily known to a haptic programmer ahead of time, without at least a basic haptic signal available, content play within applications running on playback devices can be severely hamstrung by inadequate haptic signal conversion results. By multiplexing a basic haptic signal into the combined haptic waveform, at least a high quality basic haptic experience is produced.

Figure 2:
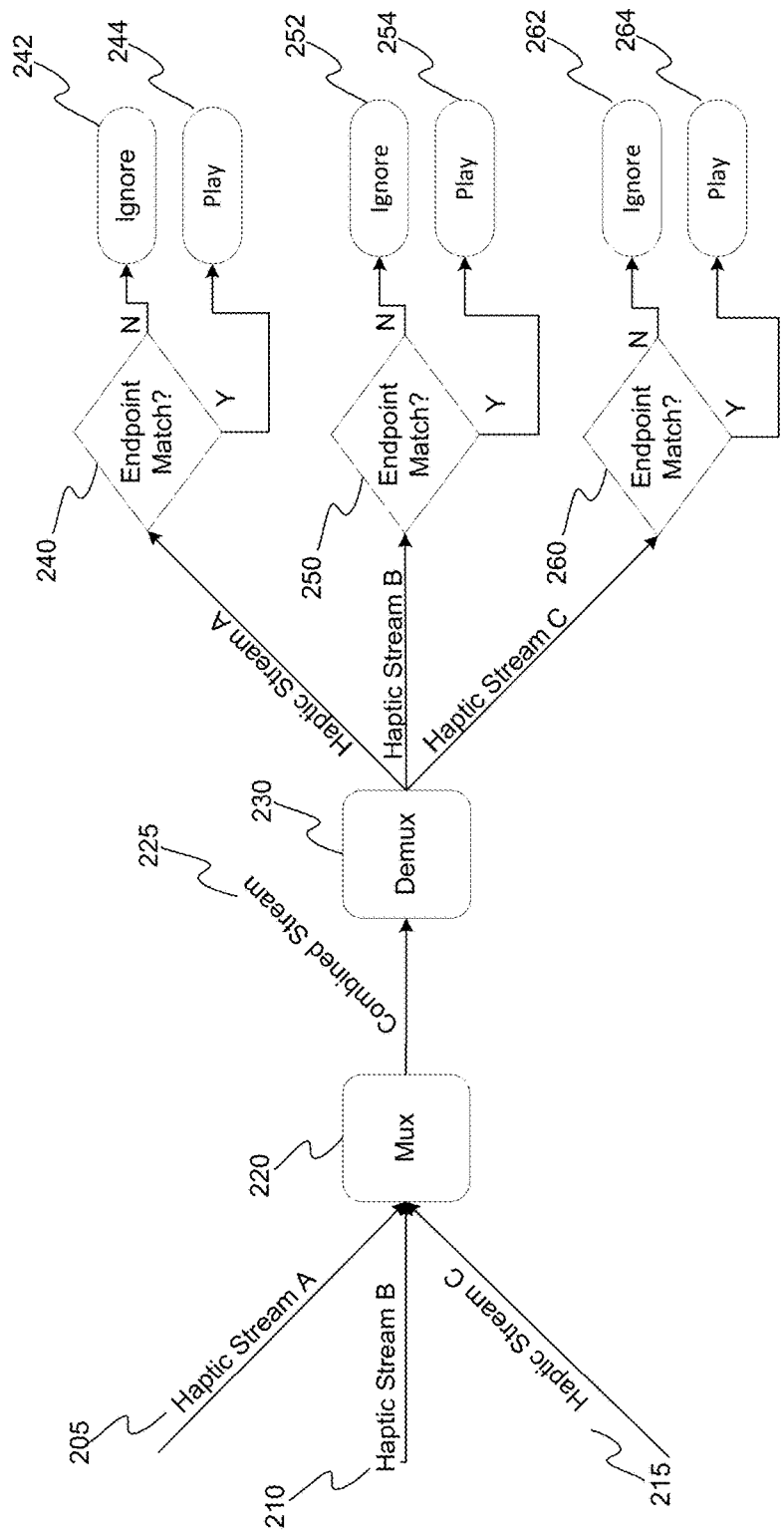
FIG. 2 is a block diagram illustrating high level logic multiplexing haptic control signals in accordance with one embodiment.

FIG. 2 is a block diagram illustrating high level logic multiplexing haptic control signals in accordance with one embodiment. Elements 205, 210, and 215 correspond to haptic streams A, B, and C, respectively. At 220, haptic streams A, B, and C are multiplexed into a single combined stream. At 225, the combined stream is delivered to the playback device for rendering into haptic effects. At 230, the combined stream is demultiplexed at the playback device such as device 10 of FIG. 1 for presentation to the user. At 240, haptic stream A is considered at processor 12 and if the stream type for stream A corresponds to the type of actuator used in the system, at 244, the stream is played on the system by drive circuit 16 and actuator 18, otherwise at 242, the stream is ignored. At 250, haptic stream B is considered at processor 12 and if the stream type for stream B corresponds to the type of actuator used in the system, at 254, the stream is played on the system by drive circuit 16 and actuator 18, otherwise at 252, the stream is ignored. At 260, haptic stream C is considered at processor 12 and if the stream type for stream C corresponds to the type of actuator used in the system, at 264, the stream is played on the system by drive circuit 16 and actuator 18, otherwise at 262, the stream is ignored. Alternatively, in some embodiments, demultiplexer 230 has access to information describing the type of actuator used in system 10. In such embodiments, at demultiplexing 230, the demultiplexer extracts and sends the appropriate haptic stream to drive circuit 16.

In some embodiments, multiplexing is performed within a haptic programming environment by a haptic programmer or by using a tool that can analyze audio files, such as audio files associated with a video file, and generate a haptic effects file to correspond to the audio file. For example, Avid Corporation's Pro Tools "AudioSuite" plugin can contain an off-line audio-to-haptics converter. Conversion algorithms may also be used in batch command line formats to convert audio signals to haptic signals and can also be used to multiplex the signals as described herein. Three basic types haptic effects files can be generated: a basic haptic signal, a standard definition haptic signal, and a high definition haptic signal (these three are also referred to herein as "control signals"). One of skill in the art will understand that additional types may be developed and that other parameters may be involved in the conversion so that each type can have multiple variations of haptic streams. Whether the source is an audio source conversion or haptic effects specified by a haptic programmer, each of these three haptic streams are derived from the same input or source (and are intended to provide the same general haptic effect), but differ due to the different haptic output device technologies available. These three streams can be multiplexed at 220 into a single stream. The multiplexed signal can then be downloaded or streamed to haptic playback device 10. The multiplexing and demultiplexing can be done in different devices or the same device. The multiplexed signal will be demultiplexed at 230 in playback device 10 and the haptic signal corresponding to the type of actuator 18 in playback device 10 will be used to play the haptic effects. The other streams can be ignored. In some embodiments, demultiplexing at 230 may occur at a streaming server, with playback device 10 requesting a particular haptic signal based on the type of actuator 18. The streaming server can then demultiplex the haptic signals and stream the appropriate haptic signal for actuator 18.

Figure 3:
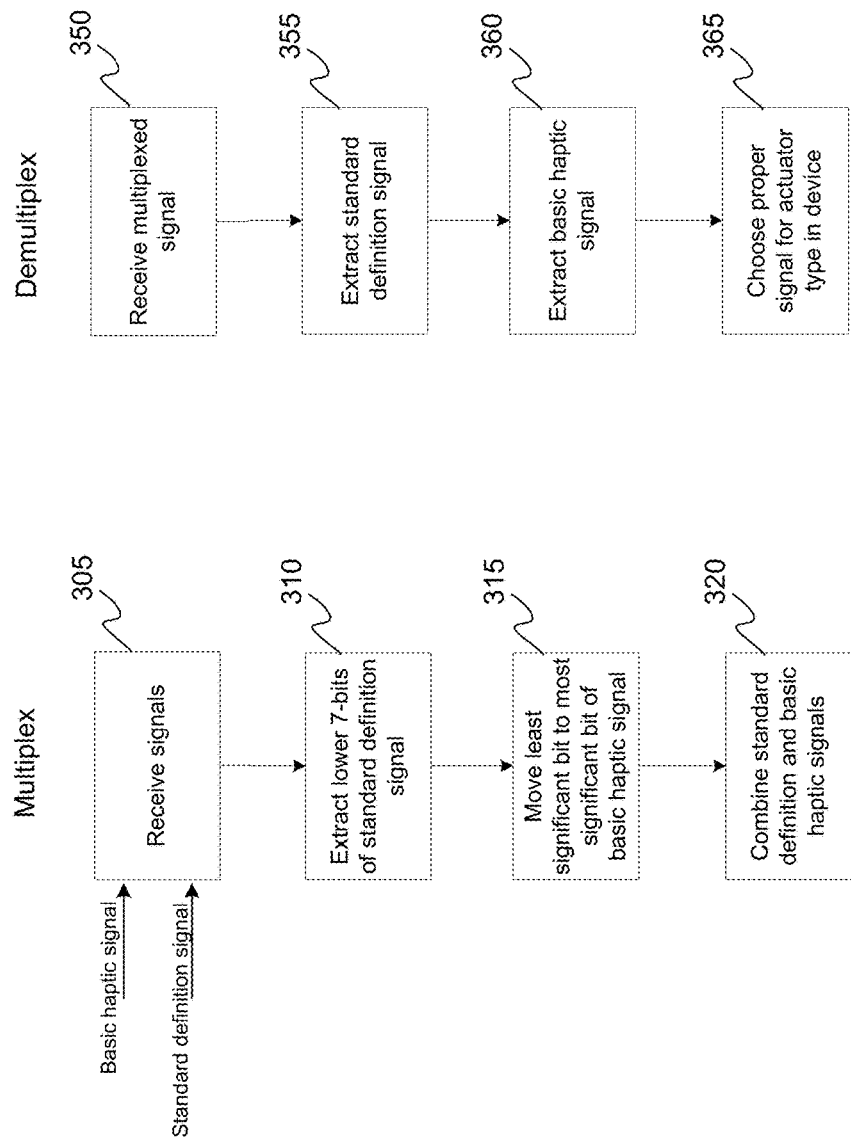
FIG. 3 is a flow diagram illustrating multiplexing and demultiplexing haptic control signals in accordance with one embodiment.

FIG. 3 is a flow diagram illustrating multiplexing and demultiplexing haptic control signals in accordance with one embodiment. In one embodiment, the functionality of the flow diagram of FIG. 3 (and FIGS. 4-6 and 9 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In some embodiments, a basic haptic signal is multiplexed with a standard definition signal. As described above, the basic haptic signal is generally made up of discrete samples of single bits of information representing an on or off state at a frequency of about 5 ms or 200 Hz. The standard definition control signal is generally made up of discrete amplitude samples of a signed byte of information also at a frequency of 200 Hz. The multiplexing process in FIG. 3 in one embodiment is a bit-field combination where the sign bit of the standard definition signal is used to encode the basic haptic signal instead.

At 305, a basic haptic sample and standard definition sample are received from a basic haptic stream and standard definition stream, respectively. At 310, the lower 7 bits of the standard definition signal are extracted by bit wise AND-ing the byte with the value 0x7F (01111111). The resulting byte will always lead with a 0 (zero). In some embodiments, if the standard definition signal is a full range signal using values of +/−127, the sample byte may be right shifted to divide the value by two, but preserve the sign bit. At 315, the basic haptic signal is represented by a byte (either 0x00 or 0x01, in hexadecimal) and the bits are shifted left 7 times, to move the least significant bit into the most significant bit, resulting in either a value of 0x80 or 0x00. At 320, the standard definition and basic haptic signals are combined by bit wise OR-ing the two values to produce a single byte (or they could be added together), with the most significant bit corresponding to the basic haptic signal and the least significant bits corresponding to the standard definition signal. This is repeated for every sample to produce the entire multiplexed haptic signal.

To demultiplex the combined signal at playback time, at 350, the combined signal would be received as a single byte of information for a sample. At 355, the standard definition signal sample would be extracted by bit-wise AND-ing the byte with 0x7F to produce a standard definition sample byte. In some embodiments, if the standard definition signal is a full range signal using original values of +/−127, the signal sample may be left shifted to multiply the sample value by two, restoring the sign bit. Interpolation, explained in further detail below, may be used to restore granularity between signal levels that was lost when the full range standard definition signal was divided by two. At 360, the basic haptic signal would be extracted by taking the original combined signal and right shifting 7 times, putting the most significant bit into the least significant bit's place and filling with leading zeros. At 365, the proper signal is chosen for the actuator type found in the device. The appropriate demultiplexed signal is sent to actuator 18 by processor 12.

Figure 4:
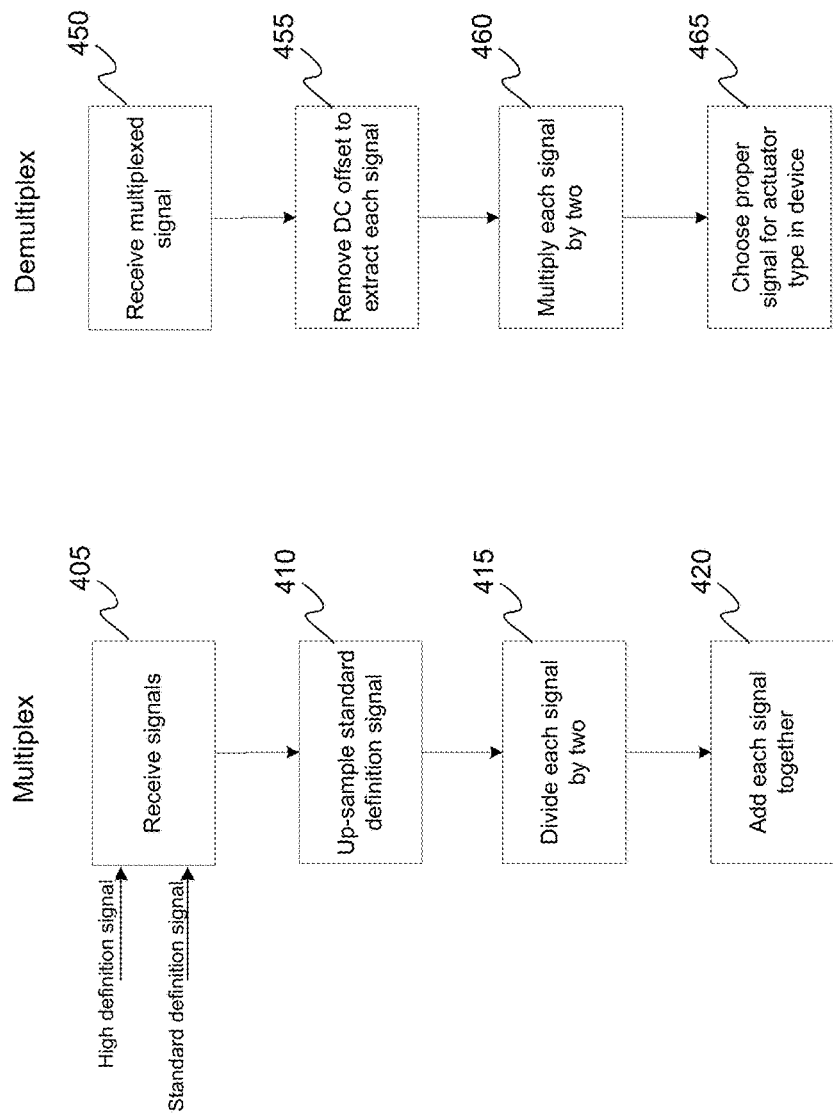
FIG. 4 is a flow diagram illustrating multiplexing and demultiplexing haptic control signals in accordance with one embodiment.

FIG. 4 is a flow diagram illustrating multiplexing and demultiplexing haptic control signals in accordance with one embodiment. For this embodiment, a high definition haptic signal (used for example, with a piezoelectric actuator) is multiplexed with a standard definition haptic signal. In some embodiments, a high definition haptic signal is represented by a full waveform at 8 kHz with a value at any given sample being a byte of information with a value ranging from −127 to 127. Other embodiments may represent a high definition haptic signal by a full waveform at other frequencies and ranges, such as at a frequency of 16 kHz. In some embodiments, the frequency of a high definition signal can vary. In some embodiments, a standard definition control signal (used for example, with an LRA actuator) is an amplitude signal at 200 Hz represented by a signed byte of information at any given sample. Other embodiments may represent a standard definition signal at other frequencies and ranges, such as at a frequency of 300 Hz. In some embodiments, the frequency of a standard definition signal can also vary. One of ordinary skill will understand that these frequencies and ranges may vary, but will understand that an actuator designed to play a high definition signal can typically handle a much higher frequency signal than an actuator designed to play a standard definition signal. The multiplexing process in FIG. 4 can create a DC offset over sample subsets of the high definition signal.

At 405, the high definition and standard definition control signals are received. At 410, the standard definition control signal is up-sampled to match the high definition control signal frequency. Some interpolation to reduce stair stepping and provide smoothing may be desired depending on whether the standard definition signal frequency is a direct multiple of the high definition control frequency. At 415, the two signals are divided by two, losing the remainder. This division may be performed by right-shifting each sample one place, losing the least significant bit. In other embodiments, at 415, the two signals are scaled such that their addition falls within the expected range of the output. For example, in the case where the output is expected to range from +/−127, in one embodiment, the high definition signal may be scaled by 60% and the standard definition signal may be scaled by 40%, such that their addition will equal 100%. This can be accomplished by known means, for example, by a multiplier with a float value or by a divider with a scaled value. The values may be scaled at any representation depending on how the designer wishes to emphasize the accuracy of one signal over the other. Generally, the higher scaled signal will be more accurate when decoding/demultiplexing. At 420, the two signals are added together to produce a combined signal. For some signals, this effectively creates a DC offset to the high definition signal because the standard definition signal changes at a much lower frequency than the high definition signal and so appears as a DC offset to the high definition control signal. Because the two signals were divided by two (or scaled to some other value as described above), some granularity is lost for both signals because the range was reduced from −127 through 127 to −63 through 63. This is repeated for every sample to produce the entire multiplexed haptic signal.

To demultiplex the combined signal at playback device 10, at 450, the combined multiplexed signal is received. Any given sample of the 8 kHz combined signal is represented by a byte. At 455, the DC offset is removed. Techniques for removing a DC offset are known in the art. For the standard definition signal, the combined signal can be put through a low-pass filter, allowing the low frequency standard definition signal to pass through, but preventing the high frequency high definition signal from passing through. For the high definition signal, the standard definition signal can be subtracted from the combined signal to produce the high definition signal. Alternatively, the combined signal can be put through a high-pass filter, allowing the high frequency high definition signal to pass through, but preventing the low frequency standard definition signal from passing through. Other techniques that may be used to remove the DC offset include an enveloping technique which is similar to the low-pass filter in this example. At 460, each of the extracted signals for standard definition control and high definition control are multiplied by two (or scaled back to their original proportional values as described above, e.g., divided by 60% in the case of the high definition signal) to bring them back to the approximate values as before multiplexing. In one embodiment, to improve granularity, interpolation may be used between values as desired to provide smoother transitions. For example, a set of samples with the values 4, 4, 6, 6, 8, 8, 10 after demultiplexing and doubling could be interpolated to be 4, 5, 6, 7, 8, 9, 10. Also at 460, the standard definition signal can be down-sampled back to 200 Hz or whatever the starting frequency was. At 465, the proper signal is chosen for the actuator type found in device 10. The appropriate demultiplexed signal is sent to the actuator 18 by processor 12.

In some embodiments, the multiplexing and demultiplexing can account for the characteristics of the effective frequencies of the standard definition and high definition signals. Even though the high definition signal is sampled at a greater frequency than a standard definition signal, the standard definition signal may be up-sampled to match the high definition signal. These signals may be combined by taking the average of the two signals, sample by sample (divide each sample by 2 and add them). The act of dividing the signals by 2 reduces the resolution of each by one bit (an 8-bit per sample signal becomes a 7-bit per sample signal). This loss of resolution causes a slight reduction in the fidelity of both signals. After the two signals are combined, the up-sampled standard definition signal is similar to a DC offset to the high definition signal. To extract the standard definition signal, a low pass filter can be used to isolate the DC offset. A notch or high-pass filter could be used to isolate the frequencies of the high definition signal.

It is possible that the high definition signal, prior to multiplexing could contain a DC offset. In this case, adding in the standard definition signal may increase or negate the DC offset of the multiplexed signal, which after demultiplexing, would result in loss of information in the high definition signal at low frequencies and distortion in the standard definition signal from the inclusion of low frequency information from the high definition signal. Thus, in some embodiments the flow above may be altered so that at 415, prior to adding the two signals together, filtering the high definition signal with a high pass filter when the standard definition signal frequency is fairly low, for example less than 30 Hz, or notch filtering the high definition signal with a notch filter when the standard definition varies more, for example a frequency of 175 Hz to 250 Hz. Then on the demultiplexing side, at 455, in the case where the high pass filter was applied to the high definition signal at 415, a low pass filter can be applied to the multiplexed signal to extract the standard definition signal. In the case where the notch filter was applied to the high definition signal at 415, a band-pass filter can be used to extract the standard definition signal. Because the standard definition signal can fill in the filtered spots in the high definition signal, the multiplexed signal can be used for the high definition signal. A smoothing filter can be used on the high definition signal.

In addition, the two multiplexing techniques in FIGS. 3 and 4 may be combined to provide a three-way multiplexed signal that includes a basic haptic signal, a standard definition haptic signal, and a high definition haptic signal. To multiplex the signals, first the basic haptic signal would be multiplexed with the standard definition haptic signal as described in conjunction with FIG. 3, and then the multiplexed basic/standard definition signal would function as the standard definition signal for multiplexing with the high definition signal as described above in conjunction with FIG. 4. To demultiplex, first the basic/standard definition signal would be demultiplexed from the high definition as described in conjunction with FIG. 4. Next, the standard definition and basic haptic signals would be demultiplexed as described above in conjunction with FIG. 3.

Figure 5:
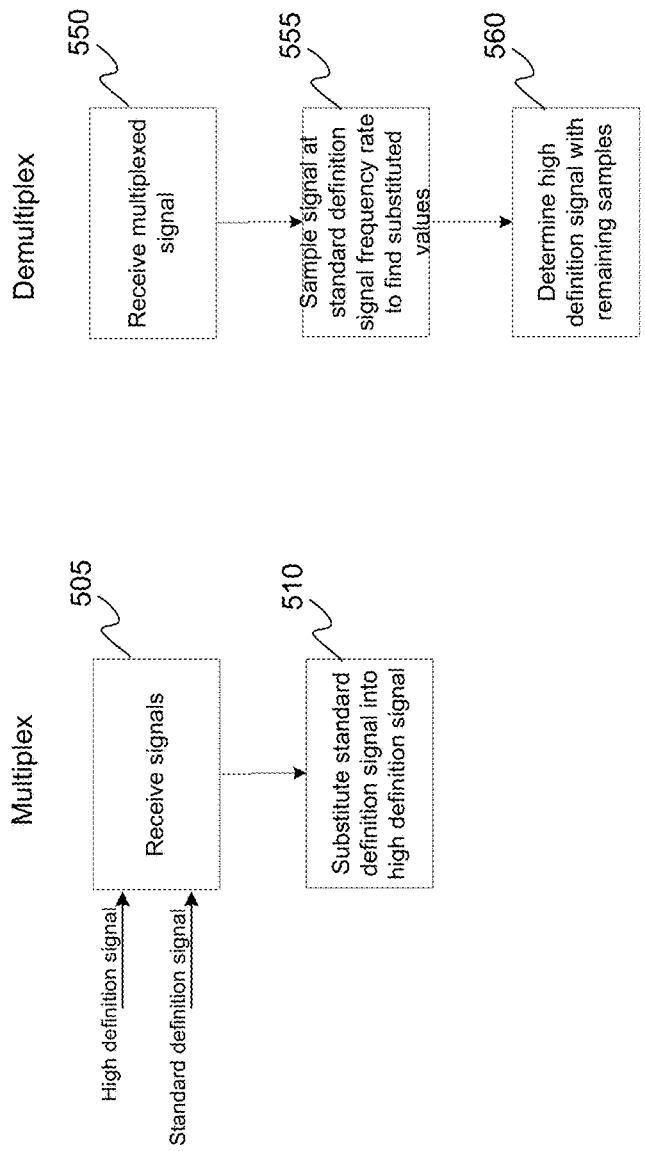
FIG. 5 is a flow diagram illustrating multiplexing and demultiplexing haptic control signals in accordance with one embodiment

FIG. 5 is a flow diagram illustrating multiplexing and demultiplexing haptic control signals in accordance with one embodiment. As an alternative to the multiplexing technique in FIG. 4, rather than combining the standard definition and high definition signals to produce a signal combined for every sampled byte, the two signals may be interlaced. At 505, the standard definition and high definition haptic control signals are received. At 510, the signals are combined by substituting samples of the standard definition signal into the high definition signal. Because the standard definition signal occurs at a much lower frequency as compared to the high definition signal, the sample for the high definition signal can be substituted with the sample for the standard definition signal without much loss to the high definition signal. For example, if the high definition signal is at 8 kHz and the standard definition signal is at 200 Hz, then a standard definition sample occurs once for every 40 high definition samples. Thus the 40th high definition sample can be substituted with the corresponding standard definition sample. This, of course, causes some samples of the piezoelectric signal to be lost.

In some embodiments, the standard definition signal can also be up-sampled to allow the substitution to occur more often. For example, the standard definition signal could be effectively up-sampled to 1 kHz by substituting every eighth high definition sample with the standard definition sample and repeating the same substitution five times with same value standard definition sample. In some embodiments, when the standard definition signal frequency is fairly high, for example a frequency of 175 Hz to 250 Hz, the envelope of the standard definition signal can be extracted using known techniques and up-sampled which will preserve the haptic intention and content. Then, a new standard definition signal can be created with a higher sampling rate (like 1 kHz, as above) and the signal multiplied by the envelope. Increasing the substitution frequency may help by providing for smaller processing buffers to pass the high definition and standard definition control signals through to the actuator as appropriate. Also, increasing the substitution frequency increases the granularity for which the standard definition samples are processed and may provide better performance. However, increasing the substitution frequency also increases the loss of signal information in the high definition signal. No matter what substitution frequency is chosen, in some embodiments, loss can be minimized by encoding the high definition signal value sample immediately prior to the substituted value to replace the most significant bits of the prior sample with the least significant bits of the removed sample. This retains some of the sample information for the removed sample by encoding it into the previous sample.

To demultiplex the combined standard definition and high definition control signals, at 550 the multiplexed signal is received. At 555, the multiplexed signal is subsampled at the same frequency for which substitution was used. In the case where the substitution occurred at 200 Hz (the same as the standard definition signal frequency), this would be every 5 ms. The subsamples can be combined to represent the standard definition signal and the remaining samples can be combined to represent the high definition signal. At 560, the remaining signal is processed for the high definition signal. Removing the standard definition signal leaves a hole in the high definition signal where the standard definition signal was substituted. The hole can be filled by taking an average of the signal value before and after the hole, by repeating the signal value before the hole, or by repeating the signal value after the hole. In some embodiments, if the previous sample's four most significant bits were encoded with the missing sample information's four least significant bits as described above, then the missing sample can be decoded by taking the four most significant bits of the previous sample as the four least significant bits of the missing sample and borrowing the four most significant bits of the sample preceding the previous sample for both the previous sample and the missing sample. In one embodiment, the four most significant bits of the missing sample can be borrowed from the sample immediately following the missing sample. In other words, considering a sequence of samples, the four most significant bits for the missing sample would come from the sample to the right and the four most significant bits for the previous sample would come from the sample to the left. This encoding/decoding technique improves performance because the most significant bits are unlikely to change from one sample to the next, but change more gradually over many samples.

In addition, the two multiplexing techniques in FIGS. 3 and 5 may be combined to provide a three-way multiplexed signal that includes a basic haptic signal, a standard definition haptic signal, and a high definition haptic signal. To multiplex the signals, first the basic haptic signal would be multiplexed with the standard definition haptic signal as described in conjunction with FIG. 3, and then the multiplexed basic/standard definition signal would function as the standard definition signal for multiplexing with the high definition signal as described in conjunction with FIG. 5. To demultiplex, first the basic/standard definition signal would be demultiplexed from the high definition signal as described in conjunction with FIG. 5. Next, the standard definition and basic haptic signals would be demultiplexed as described above in conjunction with FIG. 3.

Figure 6:
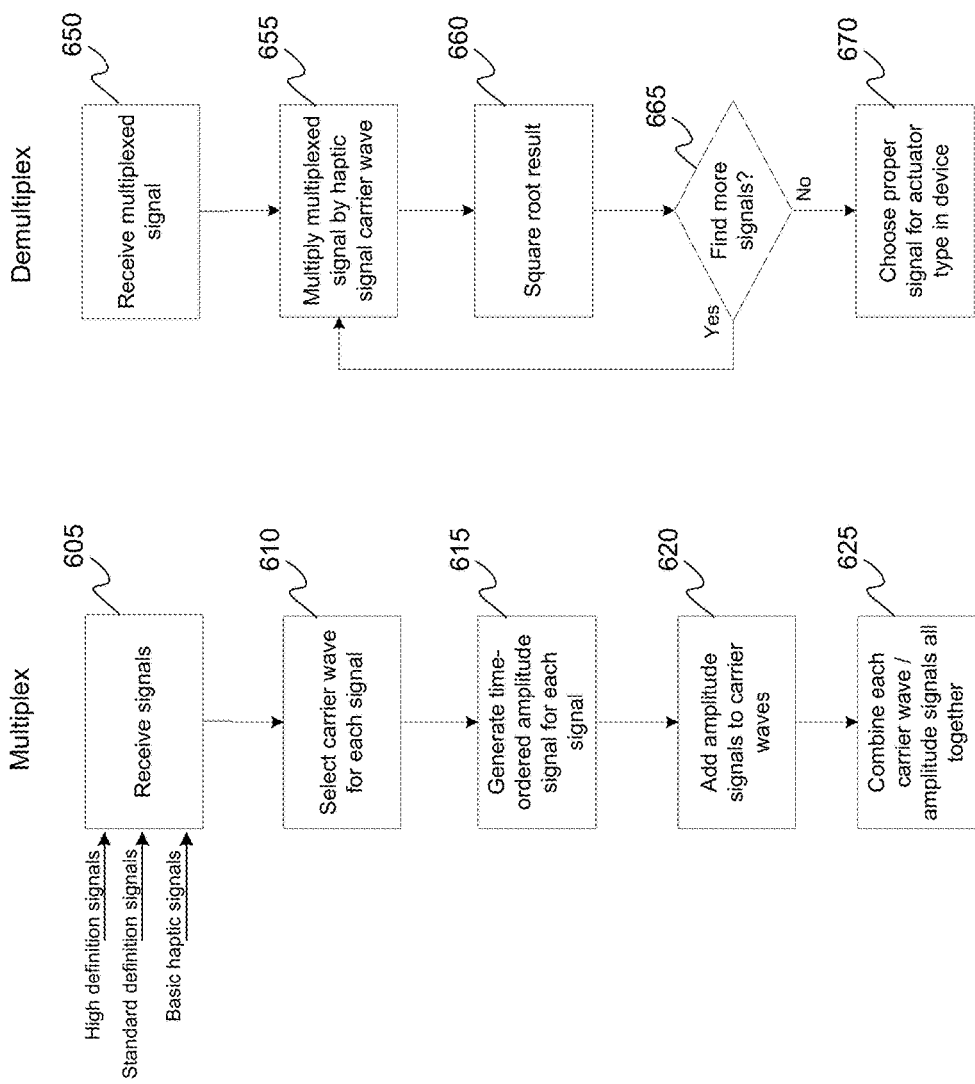
FIG. 6 is a flow diagram illustrating multiplexing and demultiplexing haptic control signals in accordance with one embodiment.

FIG. 6 is a flow diagram illustrating multiplexing and demultiplexing haptic control signals in accordance with one embodiment. Amplitude modulation can be used to multiplex all available haptic signals, including multiple alternative basic haptic, standard definition, and high definition signals. At 605, all the haptic signals are received. At 610, a sinusoidal carrier wave is selected for each of the signals such that none of the selected carrier waves are octaves (multiples) of each other. At 615, a time ordered amplitude signal is generated for each of the haptic signals. At 620, each of the amplitude signals is added to each of the selected carrier waves. At 625, each of the carrier wave/amplitude signals are combined together to produce the multiplexed signal. The data size of the signal depends on the frequency waves and valid range values selected for the carrier waves. For example, if the combined carrier waves allowed for a multiplexed value for any given sample to be greater than an 8-bit number, then extra bits may need to be added to the combined signal, thereby increasing the size and complexity. Further, the combined carrier wave should be sampled at the largest frequency of the carrier waves and the haptic signal data. Thus, the data size is dependent on the selection of the carrier waves and may vary accordingly.

To demultiplex the combined amplitude modulated haptic signal sources, at 650, the multiplexed signal is received. At 655, the multiplexed signal is multiplied by the carrier wave in the proper phase for the signal for the source haptic signal desired. At 660, the resulting signal is square rooted to find the source haptic signal. At 665, if additional haptic signals need to be found in the combined wave, go back to 655. This is repeated for each of the carrier waves used to find all of the haptic source signals. If, at the receiving end, only one of the haptic source signals is needed, then only the corresponding carrier wave needs to be processed against the modulated signal. At 670, the appropriate haptic signals are chosen based on the type of actuator in playback device 10.

Channel Multiplexing

In other embodiments, providing multiple haptic signals to a haptic playback device can be accomplished by combining all of the haptic signals into a multi-channel playback stream. In embodiments that implement channel multiplexing, the types of signals, such as a basic haptic, standard definition, and high definition signals described above remain the same types of signals that can be used in channel multiplexing. In addition, the haptic streams can be created using haptic programming and audio conversion tools, as described above.

In one embodiment, a haptic elementary stream ("HES") is created by providing header information to describe the content of a multi-channel stream that can provide two or more haptic streams. Such streams are similar to a stereo audio stream with a right track and a left track, except that each HES can hold up to 255 streams by implementation. One of ordinary skill can readily change the limit of the number of supported streams either up or down by increasing or decreasing the address space of the channel identifiers.

Figure 7:
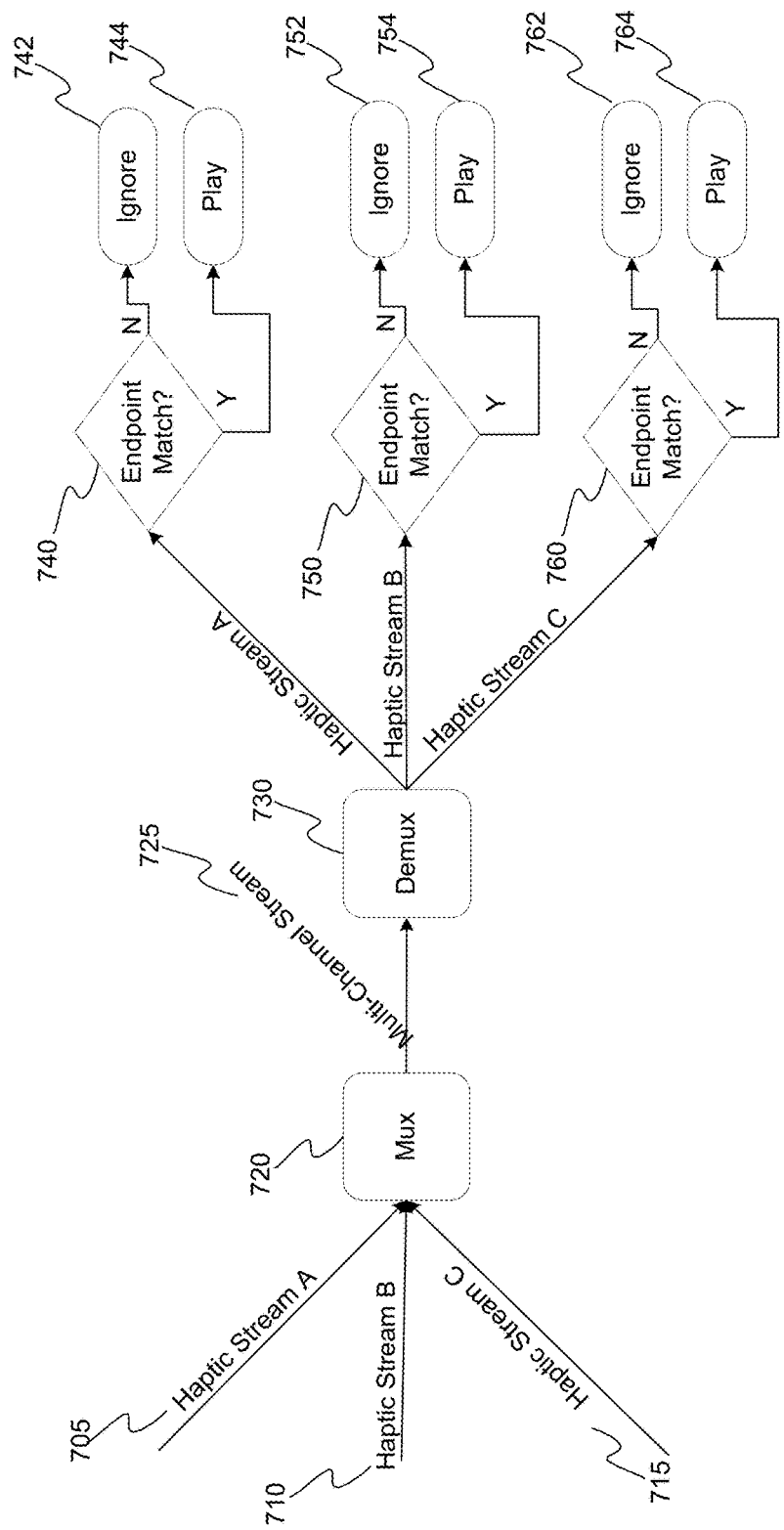
FIG. 7 is a block diagram illustrating high level logic multiplexing haptic control signals into a multi-channel stream in accordance with one embodiment.

FIG. 7 is a block diagram illustrating high level logic multiplexing haptic control signals into a multi-channel stream in accordance with one embodiment. Elements 705, 710, and 715 correspond to haptic streams A, B, and C, respectively. At 720, haptic streams A, B, and C are combined into a single multi-channel stream. At 725, the multi-channel stream is delivered to the playback device for rendering into haptic effects. In some embodiments, the multi-channel stream is delivered to a multimedia server that can select the proper haptic stream for the playback device and provide only that stream to the playback device, typically along with audio or video. At 730, the combined stream is demultiplexed into individual streams from the multi-channel stream at the playback device such as device 10 of FIG. 1 (or server) for presentation to the user. At 740, haptic stream A is considered at processor 12 and if the stream type for stream A corresponds to the type of actuator used in the system, at 744, the stream is played on the system by drive circuit 16 and actuator 18, otherwise at 742, the stream is ignored. At 750, haptic stream B is considered at processor 12 and if the stream type for stream B corresponds to the type of actuator used in the system, at 754, the stream is played on the system by drive circuit 16 and actuator 18, otherwise at 752, the stream is ignored. At 760, haptic stream C is considered at processor 12 and if the stream type for stream C corresponds to the type of actuator used in the system, at 764, the stream is played on the system by drive circuit 16 and actuator 18, otherwise at 762, the stream is ignored. In some embodiments, demultiplexer 730 can have access to information describing the type of actuator used in system 10. In such embodiments, at demultiplexing 730, the demultiplexer extracts and sends the appropriate haptic stream to drive circuit 16.

Each sample of the multi-channel stream can contain one byte for each channel. For example, if there are two streams in the multi-channel stream, there are two channels, with a total of 16-bits per sample. For haptic streams that are larger than 8 bits per sample, the number of bits used by each channel can be increased accordingly. In some embodiments, the number of bits can be rounded up to the nearest byte-length or nibble-length. For example, if a haptic signal has a sample with a value taking 10 bits, it could be stored in a channel of the HES that is 16 bits if rounding by byte-lengths or 12-bits if rounding by nibble-lengths.

Information about how the HES file is organized can be contained in a header. The HES file header can contain information describing the content of the stream such as, the number of channels, the number of bits per sample, the sample rate, an indicator to indicate which channel corresponds to which type of haptic signal or intended haptic playback device type, encoding information, compression information, and version information.

Figure 8:
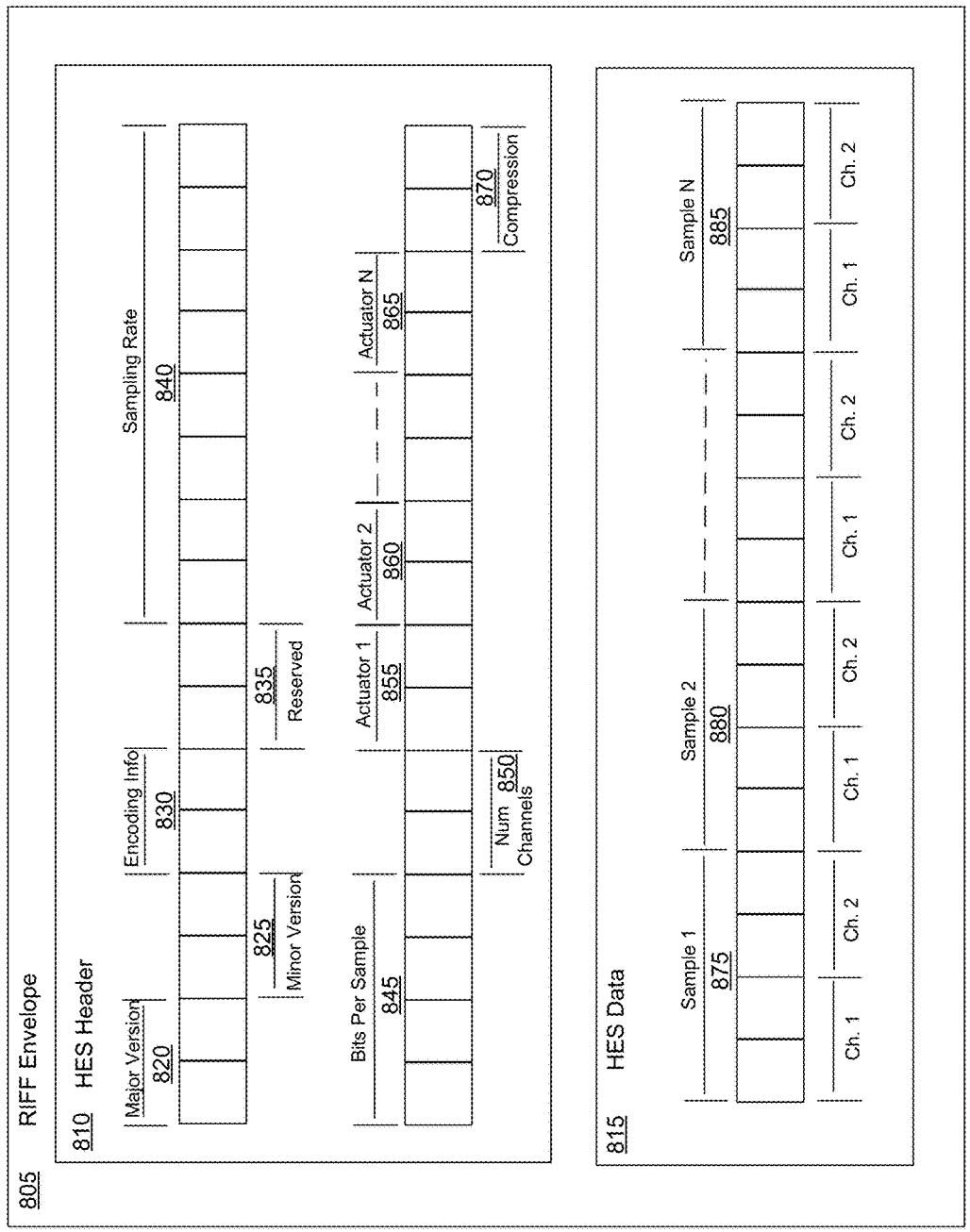
FIG. 8 contains an example of header information for a multi-channel file in accordance with one embodiment.

FIG. 8 contains an example of header information for a multi-channel file in accordance with one embodiment. Each slot of the lines of 16 slots represents a nibble; two consecutive slots represent a byte. At 805, the HES file is contained in a standard Resource Interchange File Format ("RIFF") file envelope. The HES file can consist of a defined header format, as in 810, and a defined data portion, as in 815. In header 810, the byte for 820 represents a major version identifier to identify the major version associated with the HES file. The byte for 825 represents a minor version identifier to identify the minor version associated with the HES file. For example, if the HES version were 6.2, the 6 can correspond to the major version and the 2 can correspond to the minor version. The byte for 830 represents encoding info for the data in file which can include values corresponding to encoding schemes such as "Uncompressed LPCM," "Time-Ordered Amplitudes," and the like. The byte for 835 can be reserved for some future use associated with future versions. The four bytes for 840 can represent the sampling rate in hertz. The two bytes for 845 can represent the number of bits per sample. The byte for 850 can represent the number of channels in the file. The bytes for 855, 860, and 865 can describe a particular actuator or end device types for each channel. The number of bytes reserved to describe each channel should correspond to the number of channels, one for each channel. Thus, the byte for 855 can specify the target haptic device for channel 1; the byte for 860 can specify the target haptic device for channel 2; and the byte for 865 can specify the target haptic device for channel N. The byte for 870 can represent a compression scheme put on the data. For example, known lossy and lossless data compression schemes can be applied to the data.

For HES data 815, an illustrative example is shown that specifies two channels for each sample, with 8-bits for each channel. The two bytes for 875 can represent the first sample, and the first two nibbles can represent the first channel haptic stream while the second two nibbles can represent the second channel haptic stream. The two bytes for 880 are set up the same as 875 but can have different values. The pattern can repeat for all samples until the last sample, sample N, represented by the two bytes 885. One of ordinary skill will recognize that the number of nibbles or bytes used for each of the fields of HES header 810 can be changed at will in accordance with a particular preference. Further, one of ordinary skill will recognize that the format of HES data 815 will change based on the parameters established in the header portion, which can increase the number of channels per sample and the number of bits per sample.

FIG. 9 is a flow diagram illustrating multiplexing and demultiplexing haptic control signals in accordance with one embodiment. For multi-channel multiplexing, at 905, the haptic signals are received. As noted above, these signals can be generated from the same source and can generally represent the same haptic effects but on different target haptic playback devices. In some embodiments, a multi-channel signal can contain channels also for representing other haptic effects. For example, a multi-channel haptic signal can contain three channels for one haptic effect from one source and three channels for another haptic effect from another source. In such cases, the target haptic playback device may have multiple haptic output devices and each source corresponds to one haptic output device. At 910, the received signals are analyzed and up-sampled to the highest frequency signal. Also at 910, the samples are padded to produce a uniform width sub-sample for each channel for each sample of the multi-channel stream. For example, a basic haptic signal can be up-sampled to match the sampling frequency of a standard definition haptic signal. The basic haptic signal can also be padded with zeros so that it contains the same number of bits as the standard definition signal. In some embodiments, however, a configuration option can allow different channels to have different numbers of bits in each sub-sample.

At 915, information about each stream is used to define the header. Additional parameters can be specified to define other elements, such as the target haptic output devices for each channel. At 920, each sample of each signal is combined to create a data sample that has the same number of bits as each sample combined. Each sample becomes a sub-sample or channel sample for the multi-channel stream at any given sample.

For demultiplexing, at 950 a multi-channel multiplexed stream is received by a device for demultiplexing. As referenced above, the device may be the haptic playback device or a server that extracts a stream to provide to the haptic playback device. In some embodiments, a playback device can submit its capabilities to a streaming server that selects the channel based on the playback device capabilities and streams only the selected channel to the playback device, thereby reducing the bandwidth required to play the haptic content. At 955, header information for the multi-channel stream is analyzed. The number of channels and characteristics is determined. Based on the number of bits and channels, the data can be parsed into individual streams. At 960, the channel to demultiplex is selected based on characteristics of the target haptic playback device. At 965, the haptic signal is extracted by parsing the data in the multi-channel stream. The data can be truncated to remove added padding and down-sampled for playback on the haptic output device.

As disclosed, embodiments implement a haptic source signal multiplexer that may multiplex two or more haptic signals into one multiplexed signal. The multiplexed signal can be demultiplexed at the target device and the appropriate signal selected for playback on the haptic system of the target device. Thus, haptic designers are able to create a single signal with multiplexed haptic streams for playback on a variety of target devices having a variety of haptic output devices.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of multiplexing haptic effects, the method comprising:
receiving a first haptic control signal and a second haptic control signal, wherein the first haptic control signal and the second haptic control signal are each generated from the same media content, and the first haptic control signal is adapted to be rendered using a first type of haptic output device and the second haptic control signal is adapted to be rendered using a second type of haptic output device;
combining by multiplexing the first haptic control signal and the second haptic control signal into a single data stream, wherein each of the first haptic control signal and the second haptic control signal comprises a haptic data stream that comprises a respective plurality of data bytes, wherein the plurality of data bytes for the first control signal comprises discrete first samples of bits that provide information representing an on state or off state, and the plurality of data bytes for the second control signal comprises discrete amplitude second samples of a signed byte of information; and
sending the single data stream to a demultiplexer coupled to a playback device, wherein the playback device comprises at least one of the first type of haptic output device or the second type of haptic output device.

2. The method of claim 1, wherein the combining comprises a bit-field combination of the first samples and the second samples.

3. The method of claim 1, wherein the combining comprises substituting samples of the first haptic control signal into the second haptic control signal.

4. The method of claim 1, wherein the combining comprises amplitude modulating each of the first haptic control signal and the second haptic control signal to generate respective amplitude modulated signals, and combining the amplitude modulated signals.

5. A non-transitory computer readable medium having instructions stored thereon that, when executed by a processor, cause the processor to multiplex haptic effects, the multiplexing comprising:

receiving a first haptic control signal and a second haptic control signal, wherein the first haptic control signal and the second haptic control signal are each generated from the same media content, and the first haptic control signal is adapted to be rendered using a first type of haptic output device and the second haptic control signal is adapted to be rendered using a second type of haptic output device;

combining by multiplexing the first haptic control signal and the second haptic control signal into a single data stream, wherein each of the first haptic control signal and the second haptic control signal comprises a haptic data stream that comprises a respective plurality of bytes, wherein the plurality of data bytes for the first control signal comprises discrete first samples of bits that provide information representing an on state or off state, and the plurality of data bytes for the second control signal comprises discrete amplitude second samples of a signed byte of information; and sending the single data stream to a demultiplexer coupled to a playback device, wherein the playback device comprises at least one of the first type of haptic output device or the second type of haptic output device.

6. The non-transitory computer readable medium of claim 5, wherein the combining comprises a bit-field combination of the first samples and the second samples.

7. The non-transitory computer readable medium of claim 5, wherein the combining comprises substituting samples of the first haptic control signal into the second haptic control signal.

8. The non-transitory computer readable medium of claim 5, wherein the combining comprises amplitude modulating each of the first haptic control signal and the second haptic control signal to generate respective amplitude modulated signals, and combining the amplitude modulated signals.

9. A system for multiplexing haptic effects, the system comprising:

a receiver for receiving a first haptic control signal and a second haptic control signal, wherein the first haptic control signal and the second haptic control signal are each generated from the same media content, and the first haptic control signal is adapted to be rendered using a first type of haptic output device and the second haptic control signal is adapted to be rendered using a second type of haptic output device;

a combiner for combining by multiplexing the first haptic control signal and the second haptic control signal into a single data stream, wherein each of the first haptic control signal and the second haptic control signal comprises a haptic data stream that comprises a respective plurality of bytes, wherein the first haptic control signal comprises a full waveform having a first frequency and having, for each sample of the first haptic control signal, a value represented by a byte of information, the byte being one of the plurality of data bytes for the first haptic control signal, and wherein the plurality of data bytes for the second haptic control signal comprises discrete amplitude second samples of a signed byte of information; and a transmitter for sending the single data stream to a demultiplexer coupled to a playback device, wherein the playback device comprises at least one of the first type of haptic output device or the second type of haptic output device.

10. The system of claim 9, wherein the combining comprises up-sampling the second haptic control signal to the first frequency to generate an up-sampled second haptic control signal and adding the first haptic control signal with the up-sampled second haptic control signal.

11. The system of claim 9, wherein the combining comprises substituting samples of the first haptic control signal into the second haptic control signal.

12. The system of claim 9, wherein the combining comprises amplitude modulating each of the first haptic control signal and the second haptic control signal to generate amplitude modulated signals, and combining the amplitude modulated signals.

* * * * *